United States Patent [19]

Longi et al.

[11] Patent Number: 4,613,655

[45] Date of Patent: Sep. 23, 1986

[54] CATALYSTS FOR THE POLYMERIZATION OF OLEFINS

[75] Inventors: Paolo Longi; Umberto Giannini, both of Milan; Romano Mazzocchi, Pernate; Domenico Deluca, Milan, all of Italy

[73] Assignee: Montedison S.p.A., Milan, Italy

[21] Appl. No.: 225,366

[22] Filed: Jan. 15, 1981

Related U.S. Application Data

[63] Continuation of Ser. No. 811,974, Jun. 30, 1977, abandoned, which is a continuation-in-part of Ser. No. 579,861, Apr. 17, 1975, abandoned, which is a continuation of Ser. No. 412,507, Nov. 2, 1973, abandoned, which is a continuation of Ser. No. 164,008, Jul. 19, 1971, abandoned.

[30] Foreign Application Priority Data

Jul. 20, 1970 [IT] Italy ............................... 27627 A/70

[51] Int. Cl.$^4$ ..................... C08F 4/02; C08F 10/02
[52] U.S. Cl. ..................... 526/114; 502/113; 502/118; 502/134; 526/121; 526/122; 526/124; 526/125; 526/352; 526/906
[58] Field of Search ............... 526/121, 122, 124, 125; 526/114; 252/429 C; 502/113, 118, 134

[56] References Cited

U.S. PATENT DOCUMENTS

| | | | |
|---|---|---|---|
| 2,981,725 | 4/1961 | Luft et al. | 526/125 |
| 3,085,999 | 4/1963 | Tung | 526/124 |
| 3,644,318 | 2/1972 | Diedrich et al. | 526/124 |
| 3,850,842 | 11/1974 | Longi et al. | 526/125 |
| 3,883,492 | 5/1975 | Delbouille et al. | 526/124 |
| 4,056,668 | 11/1977 | Berger et al. | 526/124 |
| 4,298,718 | 11/1981 | Mayr et al. | 526/125 |

FOREIGN PATENT DOCUMENTS

| | | | |
|---|---|---|---|
| 1905583 | 9/1969 | Fed. Rep. of Germany | 526/125 |
| 1958488 | 5/1970 | Fed. Rep. of Germany | 526/125 |
| 1958046 | 6/1970 | Fed. Rep. of Germany | 526/125 |
| 2135884 | 1/1972 | Fed. Rep. of Germany | 526/125 |
| 925729 | 5/1963 | United Kingdom | 526/125 |
| 1140649 | 1/1969 | United Kingdom | 526/124 |

*Primary Examiner*—Edward J. Smith

[57] ABSTRACT

New catalysts for the polymerization of olefins and more particularly of ethylene and mixtures thereof with higher alpha-olefins and/or diolefins, are disclosed. The catalysts are prepared by mixing (a) a hydride or an organo-metallic compound of a metal belonging to Groups I, II or III of the Mendelyeev Periodic Table with (b) the product obtained by contacting a titanium compound (1) with a mixture of an anhydrous magnesium halide (2) in a particular active form and an anhydrous compound of a metal belonging to Group I or II of said Periodic Table, (3). In the particular active form to which it is converted, during or prior to the contacting the anhydrous magnesium halide is characterized in that, in its X-ray spectrum, the diffraction line which is most intense in the X-ray spectrum of the normal, inactive magnesium halide shows a decreased intensity, and/or the active magnesium halide has a surface area greater than 3 m$^2$/g.

22 Claims, No Drawings

CATALYSTS FOR THE POLYMERIZATION OF OLEFINS

This is a continuation of application Ser. No. 811,974 filed June 30, 1977, now abandoned, which in turn is a continuation-in-part of Ser. No. 579,861, filed Apr. 17, 1975 (now abandoned), which in turn is a continuation of Ser. No. 412,507 filed Nov. 2, 1973 (now abandoned) which in turn is a continuation of Ser. No. 164,008 filed July 19, 1971 (now abandoned).

THE PRIOR ART

The homo- and co-polymerization of ethylene has been carried out heretofore with the aid of catalysts of various types.

Among the best known such catalysts nowadays are those prepared by mixing transition metal compounds with organometallic compounds of the Groups I to III metals.

In earlier applications originating with our research group, it was shown that catalyst of markedly increased activity could be obtained by contacting titanium or vanadium compounds with carriers consisting of anhydrous halides of magnesium or manganese which were activated to a particular form during, or prior to, the contacting, and then mixing the resulting product with hydrides or organometallic compounds of the Groups I to III metals.

THE PRESENT INVENTION

We have found that, surprisingly, it is possible to obtain catalysts the activity of which, in the polymerization of olefins, is comparable to that of the catalysts obtained by contacting a Ti compound with active Mg dihalide as sole catalyst support or which are very highly active in comparison with unsupported Ziegler/Natta catalysts and in comparison with such catalysts the sole support of which is a carrier different from Mg dihalide in active condition, by mixing components which comprise (a) a hydride or organometallic compound of a metal belonging to one of Groups I to III of the Mendelyeev Periodic Table and (b) the product obtained by contacting (1) a Ti compound with a support consisting of a mixture of (2) an anhydrous Mg dihalide and (3) an anhydrous compound of a metal belonging to one of Groups I and II of said Periodic Table, the anhydrous Mg dihalide (2) being in an active state such that the support and component (b) have a surface area exceeding 3 m$^2$/g, or the X-rays powder spectrum of component (b) does not show the most intense diffraction lines as they appear in the X-rays powder spectrum of the normal, non-active Mg dihalide, the X-rays powder spectrum of component (b) showing a broadening of said most intense diffraction lines; the anhydrous compound of the Group I or II metal (3) being different from component (a) and non-reactive, or substantially non-reactive, with the anhydrous Mg dihalide under the conditions of preparing the catalyst.

By "non-reactive" or "substantially non-reactive", with respect to the compound of Group I or II metal, is meant that the compound of the Group I or II metal does not interact at all with the Mg dihalide under the conditions of the catalyst preparation or not to any extent which would alter the efficacy of the active Mg dihalide.

The fact that the addition of compounds of the metals of Group I or II of the Periodic Table to the Mg or Mn dihalide, in active state, does not reduce appreciably the activity of the catalysts therefrom but generally increases said activity, is completely unexpected, if one considers that the activity of the catalysts supported on, as sole carrier, said compounds of metals of I and II Group, is very low. The addition should have produced a remarkable reduction in the activity.

The anhydrous compounds used as cosupports with an anhydrous Mg dihalide are selected from the group of the salts and oxides of the metals of Groups I or II of the Periodic Table. They are all operative for the use of cosupports according to this invention, provided they do not react or do not substantially react with the anhydrous Mg dihalide under the conditions of the catalyst preparation.

The present catalysts have all of the advantages of the supported catalysts disclosed earlier by our research group and some additional advantages, as well.

The anhydrous compounds of the metals belonging to Groups I and II which we use as diluents in the carriers are different from component (a) of the catalyst and do not interact to any substantial extent with the active Mg halide, under the conditions of preparation of the carrier, even when the Group I or II metal compound is used in considerable quantities.

The anhydrous magnesium halide can be converted to the active form during the contacting with the titanium compound. Also, the anhydrous magnesium halide can be converted to the active form prior to such contacting, and may be in the active form as a result of how it is obtained.

One of the most suitable methods for converting the magnesium halide to the particular active form is to dissolve magnesium halide in water, alcohols, ethers or other organic or inorganic solvents, remove most of the solvent by rapid evaporation, and then complete the solvent removal under reduced pressure and at temperatures higher than 100° C., and comprised, more particularly, between 150° C. and 500° C.

The preactivated Mg halide can be obtained, also by very fine grinding of the carrier particles, or by any other physical method involving subjecting the carrier particles to the action of friction and/or sliding forces.

Another method for obtaining the Mg halides in the active form is by disproportioning a Grignard reagent of the formula RMgX in which R is a hydrocarbon radical and X is halogen, or by treating the RMgX compound with a halogenated substance such as gaseous hydrogen chloride.

The anhydrous magnesium halide can be obtained in the active form by thermal decomposition, under reduced pressure, of an addition compound of the halide with a Lewis acid base.

A presently preferred method of preparing the supported catalyst-forming component (b) consists in co-grinding the Ti compound with a mixture of the Mg halide and an anhydrous compound of the metal belonging to Groups I or II.

The co-grinding is preferably carried out in a ball mill, under dry conditions, without use of any liquid diluent or solvent.

The supported catalyst-forming component (b) can also be prepared by simply mixing the Ti compound with a previously ground mixture of the Mg halide and the anhydrous compound of the Group I or II metal.

The anhydrous compounds of Group I or II metals which are substantially inert to the anhydrous Mg halide under the conditions used to prepare the carrier, include:

lithium chloride, sodium chloride, sodium bromide, beryllium chloride, calcium chloride, strontium chloride, zinc chloride, zinc iodide, cadmium bromide, cuprous chloride, mercury (ic) chloride, sodium sulphate, sodium carbonate, zinc oxide, beryllium oxide, borax, calcium sulphate, calcium carbonate, beryllium sulphate, calcium stearate and sodium vinylsulphonate.

The amount of the anhydrous Group I or II metal compound which can be mixed with the anhydrous Mg halide without appreciably reducing the activity of the catalyst may vary widely.

Mixtures of the Mg halide with the Group I or II metal compounds in which the quantity of the Group I or II metal compound is from 1% to 70% by weight, preferably from 30% to 70% by weight, yield final catalysts the activity of which is comparable to, and sometimes superior to, the activity of the catalysts obtained from carriers consisting only of anhydrous $MgCl_2$ in the active form.

The titanium compounds which can be contacted with the mixture of active Mg halide, and Group I or II metal compound to obtain the supported catalyst-forming component (b), include the halides, oxyhalides, haloalcoholates, alcoholates, halo-titanates or titanates of ammonium and alkylammonium or of alkaline earth metals; Ti-amides and Ti-halo-amides; Ti salts of organic acids, as well as the addition compounds of bivalent, trivalent and tetravalent titanium with electron-donor compounds in which the electron-donor atoms are generally atoms of N, P, O and S, such as, for instance, ethers, phosphines, amines and thioethers.

Other useful Ti compounds are those obtainable from the aforesaid Ti compounds and from alcoholates and amides of the alkaline metals, such as: $LiTi(OC_3H_7)_2Cl_3$ and $LiTi(C_{12}H_8N)_4$, $C_{12}H_8N$ being the carbazyl radical.

Typical examples of titanium compounds suitable for the preparation of the catalysts of this invention are: $TiCl_4$, $TiCl_3$, $3TiCl_3 \cdot AlCl_3$, $TiI_4$, $Ti(OC_3H_7)Cl_3$, $Ti(OC_4H_9)_2Cl_2$, $Ti[O-C(CH_3)=CH-CO-CH_3]_2Cl_2$, $Ti[N(C_2H_5)_2]Cl_3$, $Ti[N(C_6H_5)_2]Cl_3$, $Ti[N(C_6H_5)_2]_4$, $TiCl_3-OSO_2-C_2H_5$, $Ti(C_6H_5COO)Cl_3$, $[N(C_4H_9)_4]_2TiCl_6$, $[N(CH_3)_4]Ti_2Cl_9$, $TiBr_4$, $O(C_2H_5)_2 \cdot 2TiCl_3$, $C_5H_5N \cdot LiTi(OC_3H_7)_2Cl_3$, $LiTi(C_{12}H_8N_4)$ (lithium-titanium-tetracarbazyl).

The amount of titanium compound used in preparing the supported catalyst-forming component (b) can vary within a wide range. For instance, the Ti compound can be used in a minimum amount of 0.01% by weight, or even less, with respect to the carrier, up to a maximum amount of 30% or higher, by weight.

Good results are obtained using catalysts in which the amount of titanium compound (1) present on the carrier comprising the mixture of (2) and (3) is from 1% to 10% by weight.

Hydrides and organometallic compounds which can be used as catalyst-forming component (a) include:
$Al(C_2H_5)_2H$, $Al(iC_4H_9)_3$, $Al(iC_4H_9)_2Cl$, $Al_2(C_2H_5)_3Cl_3$, $Al(C_2H_5)_2Cl$, $Al(iC_4H_9)_2H$, $Al(iC_2H_5)_2Br$, $LiAl(iC_4H_9)_4$, $LiC_4H_9$.

The molar ratio of organometallic compound to Ti compound is not critical.

When the catalysts are to be used for polymerizing ethylene, said molar ratio is preferably comprised between 50 and 1000.

The polymerization and copolymerization of olefins in contact with the present catalysts are carried out by the conventional methods, namely in the liquid phase, either in the presence or absence of an inert solvent; or in the gas phase.

The polymerization or copolymerization temperature may range from −80° C. to 200° C., preferably from 50° C. to 100° C., operating at atmospheric pressure or at increased pressure.

It is a particularly important advantage of the catalysts of this invention that the activity of the catalysts is not appreciably reduced when they are used in the presence of the conventional regulators of the molecular weight of the olefin polymers or copolymers, such as alkyl halides, organometallic compounds of zinc or cadmium, hydrogen, or other chain transfer agent.

This is in contrast to known catalysts such as the so-called, now conventional, "Ziegler catalysts" prepared from transition metal compounds of the type of $TiCl_4$, and organometallic compounds of the Groups I, II or III metals. As is well known, the activity of those catalysts is considerably reduced by the presence, in the polymerization system, of hydrogen or the other known chain transfer agents commonly used to regulate the molecular weight of the polymer produced.

With the present catalysts, conversely, it has been found possible to regulate the molecular weight of the polymer produced to low, and even very low values, without any noticeable decrease in the activity of these catalysts.

For instance, when ethylene is polymerized in contact with the catalysts of this invention, it is possible to adjust the molecular weight of the polyethylene produced to values in a practically desirable range corresponding to an inherent viscosity of about 1 to 3 dl/g, determined in tetralin at 135° C. And this can be accomplished without causing any decrease in the polyethylene yield, based on the amount of these particularly active catalysts used, to a value such that, at the end of the polymerization, it is necessary to subject the polymer to special purification treatments for the removal of catalytic residues from it.

The fact that the polymer can be used directly as obtained, without resort to the special purification treatments, is another marked advantage of the catalysts of this invention.

The polyethylene obtained with the aid of the present catalysts is a substantially linear and highly crystalline polymer having a density of 0.96 g/cc or higher. Its workability or processability characteristics are generally better than those of the polyethylene obtained with the aid of the standard "Ziegler catalysts".

Generally, the Ti content of the unpurified polymer obtained using the present catalysts is lower than 10 ppm.

The present catalysts in which the carrier is diluted with the Group I or II metal compound, also have some advantages over the supported catalysts disclosed previously by our research group and in which the carrier consists only of the magnesium halide in active form.

A main such advantage is that any catalytic residues remaining in the polyethylene obtained with the aid of the present catalysts comprise even smaller amounts of magnesium halide and, in consequence, afford even less possibility of corrosion when the polyethylene is molded or otherwise shaped by the usual molding and shaping procedures.

The following examples are given to illustrate the invention and are not intended to be limiting. Unless otherwise specified, percentages given in the examples are by weight. The inherent viscosity of the polymer was determined in tetralin at 135° C.

EXAMPLE 1

Into a glass mill (100 mm length and 50 mm diameter), containing 550 g of steel balls with a diameter of ⅜" each, there were introduced, under a nitrogen atmosphere, 0.41 g of $TiCl_4$ and a quantity, indicated in Table I, of anhydrous $MgCl_2$ (dried in a HCl flow for 48 hours at 350° C.), or of an equimolecular mixture of this same anhydrous $MgCl_2$ and NaCl dehydrated by calcining at 550° C.

The whole mixture was then ground for the time indicated in Table I, at a temperature of 20° C.

A given quantity of the mixture thus obtained was introduced into a stainless steel autoclave having a holding capacity of about 2 liters, fitted with an anchor stirrer, and kept at a thermostatically controlled temperature of 85° C., together with 1000 cc of anhydrous n-heptane, 2 cc of $Al(iso-C_4H_9)_3$ 5 atm of $H_2$ and 10 atm of ethylene; the whole being maintained at a constant pressure of ethylene for 8 hours.

At the end of the reaction, the contents of the autoclave were discharged and, by filtering, the polymer was separated from the reaction mass. The results, with reference to the quantity and to the inherent viscosity of the polymer obtained, as well as to the yield in polymer with respect to the titanium, the support-material and to the $MgCl_2$ used in the operation, are set forth in Table I.

From said Table, it appears quite clearly that the use of NaCl, besides allowing a reduction in the amount of $MgCl_2$ used, also results in a catalyst which exhibits maximum activity within a considerably less time than would be required if $MgCl_2$ only were used.

EXAMPLE 2

In the mill described in Example 1, were ground, in a nitrogen atmosphere, for 16 hours at 20° C., 0.41 g of $TiCl_4$, 6.38 g of anhydrous $MgCl_2$ and 3 g of anhydrous LiCl (dried under vacuum for 4 hours at 300° C.).

Using 15.2 mg of the mixture thus prepared and by polymerizing the ethylene under the conditions described in Example 1, there were obtained 280 g of polyethylene having an intrinsic viscosity of 2.06 dl/g, and in a yield of 1,800,000 g of polymer per gram of Ti used.

Under the same experimental conditions, a support consisting of an equimolecular mixture of $MgCl_2$ and NaCl, and of $MgCl_2$ alone, yielded, respectively, (see Table I) 2,000,000 g of polymer/g Ti, and 1,660,000 g of polymer/g Ti.

EXAMPLE 3

In the mill described in Example 1, under a nitrogen atmosphere, were ground, for 16 hours at 20° C., 0.41 g of $TiCl_4$, 4.42 g of $MgCl_2$ and 5.26 g of anhydrous $CaCl_2$ (obtained by dissolving commercial $CaCl_2$ in anhydrous alcohol, evaporating the solvent, and finally drying for 4 hours at a pressure of 0.1 mm Hg and at a temperature of 300° C.).

By using 18 mg of the mixture thus prepared and by polymerizing the ethylene under the conditions described in Example 1, there were obtained 320 g of polyethylene having an intrinsic viscosity of 1.94 dl/g, and in a yield of 1,800,000 g of polymer per g of Ti used.

EXAMPLE 4

In the mill described in Example 1 were ground, for 16 hours, in a nitrogen atmosphere and at 20° C., 0.41 g of $TiCl_4$, 3.26 g of $MgCl_2$ and 7.02 g of anhydrous $BaCl_2$ (obtained by heating normal $BaCl_2$ at 350° C. for 8 hours under a pressure of 0.1 mm Hg).

Using 14.9 g of the mixture thus prepared and polymerizing the ethylene at the conditions described in Example 1, there were obtained 276 g of polyethylene having an intrinsic viscosity of 1.94 dl/g. The polymer yield corresponded to 1,985,000 g of polyethylene per g of Ti used.

EXAMPLE 5

Using the mill Example 1, there were ground, for times as shown in Table II and in the amounts shown in said Table, and in a nitrogen atmosphere at 20° C., $Cl_3TiOC_3H_7$ and either anhydrous $MgCl_2$ or an equimolecular mixture of anhydrous $MgCl_2$ and anhydrous NaCl.

A certain quantity of the mixture thus obtained was then introduced into a stainless steel autoclave of about 2 liter holding capacity, fitted with an anchor stirrer and set to a thermostatically controlled temperature of 85° C., together with 1000 cc of anhydrous n-heptane, 2 cc of $Al(iso-C_4H_9)_3$, 7 atm of $H_2$ and 6 atm of ethylene. The whole was then maintained at a constant pressure of ethylene for 4 hours.

At the end of the reaction, the contents of the autoclave were discharged and the polymer was separated from the reaction product by filtering. The quantity and viscosity of the polymer obtained, as well as the yield in polymer with respect to the titanium, to the support material, and to the $MgCl_2$ used, are recorded in Table II.

EXAMPLE 6

In the mill described in Example 1, there were ground, in an nitrogen atmosphere at 20° C. and for a grinding time as indicated in Table III, $Cl_3TiOCOCH_3$, anhydrous $MgCl_2$ or an equimolecular mixture of anhydrous $MgCl_2$ and anhydrous NaCl, in the quantities specified in the Table.

A certain quantity of the mixture thus prepared was used for the polymerization of ethylene, as described in Example 5.

The results of the tests carried out are recorded in Table III.

EXAMPLE 7

In the mill described in Example 1, in an atmosphere of nitrogen, at a temperature of 20° C. and for a time indicated in Table IV, there were ground $3TiCl_3 \cdot AlCl_3$ (obtained by reduction of $TiCl_4$ with aluminum metal, and activated by grinding) and either anhydrous $MgCl_2$ or an equimolecular mixture of anhydrous $MgCl_2$ and anhydrous NaCl, in the quantities specified in Table IV.

A certain quantity of the mixture thus obtained was introduced into a stainless steel autoclave of 3 liters holding capacity, fitted with an anchor stirrer and electrically heated to a temperature of 85° C., together with 1500 cc of anhydrous n-heptane, 2 cc of $Al(iC_4H_9)_3$, 7 atm of hydrogen and 6 atm of ethylene. The pressure was then maintained constant by continuously adding ethylene, for the duration of the polymerization time (4 hours). At the end of the reaction, the autoclave was discharged and the polymer was separated by filtering and then dried.

The quantities of polyethylene obtained and the inherent viscosity of the polymer, as well as the yields in polymer with respect to the titanium, the support material and the MgCl$_2$ used, are shown in Table IV.

EXAMPLE 8

6.2599 g of MgCl$_2$, 3.7223 g of NaCl and 0.4416 g of Cl$_3$Ti—N(C$_2$H$_5$)$_2$ were ground together in the mill described in Example 1, for 40 hours at a temperature of 20° C.

Using 0.0155 g of the mixture thus ground, and carrying out the polymerization under the conditions of Example 7, there were obtained 148 g of polyethylene having an inherent viscosity of 1.23 dl/g, determined in tetralin at 135° C. The yield in polymer was 1,065,000 g/g of Ti.

Operating in the absence of NaCl and using as a catalyst 0.0143 g of the product obtained by mixing aluminum tri-isobutyl with a component obtained by grinding 9.520 g of MgCl$_2$ and 0.420 g of Cl$_3$TiN(C$_2$H$_5$)$_2$ for 64 hours under the same polymerization conditions, there were obtained 105 g of polyethylene having an inherent viscosity of 1.23 dl/g, determined in tetralin at 135° C. The yield in polymer was 820,000 g/g Ti.

EXAMPLE 9

In the mill described in Example 1, in a nitrogen atmosphere, at 20° C., and for a grinding time as indicated in Table V, there were ground TiCl$_4$ and either anhydrous MgBr$_2$ or a mixture of anhydrous MgBr$_2$ and NaBr, in the quantities specified in Table V.

Then, using a given quantity of the mixture thus obtained and operating under the polymerization conditions described in Example 1, the results recorded in Table V were obtained.

These results show that when MgBr$_2$/NaBr mixture was used as support, instead of MgBr$_2$ only, the yield of polymer, with reference to the titanium and to the MgBr$_2$ used, is considerably higher.

EXAMPLE 10

In the mill described in Example 1, in a nitrogen atmosphere, at 20° C., and for the time indicated in Table VI, there were ground TiCl$_4$ and either anhydrous MgCl$_2$ or mixtures thereof with some anhydrous compounds of the Groups I and II metals, in quantities as specified in Table VI.

Using a given quantity of the mixtures thus obtained, some ethylene polymerizations were carried out under the conditions of Example V. The results are reported in Table VI.

EXAMPLE 11

In the mill described in Example 1, in a nitrogen atmosphere, at 20° C., and for the times indicated in Table VII, there were ground anhydrous TiCl$_4$ and either anhydrous MgCl$_2$ or mixtures thereof with anhydrous halides of Group I or II metals, in quantities specified in Table VII.

Using a given quantity of the mixtures thus obtained, ethylene was polymerized under conditions as used in Example 1.

The results of the tests are shown in Table VII.

EXAMPLE 12

In the mill described in Example 1, in a nitrogen atmosphere, at 20° C., there were ground for 16 hours TiCl$_4$ or TiCl$_3$ARA (obtained by reduction of TiCl$_4$ and either anhydrous MgCl$_2$ or mixtures thereof with anhydrous halides of Group I or II metals, in amounts specified in Table VIII.

A given amount (indicated in Table VIII) of the mixture thus prepared was introduced together with n-heptane and 2 cc of Al(i—C$_4$H$_9$)$_3$ into a stainless steel autoclave provided with an anchor stirrer and adjusted at a temperature of 85° C. The whole was charged with 7 atm. of hydrogen and 6 atm. of ethylene, and the pressure was maintained constant by continuously feeding in ethylene. The polymerization was interrupted after 4 hours. The polymer was filtered and dried. The results are reported in Table VIII.

EXAMPLE 13

TiCl$_4$, anhydrous MgCl$_2$ (dried for 48 hours in HCl flow at 350° C.) or mixtures of anhydrous MgCl$_2$ with CaSO$_4$, respectively with CaCO$_3$ were ground in the mill described in Example 1 for 24 hours at a temperature of 20° C.

A given amount (indicated in Table IX) of the mixture thus prepared was introduced together with 1500 cc of n-heptane and 2 cc of Al(i—C$_4$H$_9$)$_3$ into a stainless steel autoclave of 3000 cc capacity, provided with an anchor stirrer and adjusted at a temperature of 85° C. The whole was charged with 7 atm. of hydrogen and 6 atm. of ethylene, and the pressure was maintained constant by continuously feeding in ethylene. The polymerization was interrupted after 4 hours. The polymer was filtered and dried. The results are reported in Table IX.

As will be apparent, changes in details may be made in practicing the invention, such as in the titanium compound and or the organometallic compound or hydride used in preparing the catalyst, without departing from the spirit of the invention. We intend to include in the scope of the appended claims all such modifications as will be obvious to those skilled in the art, from the description and working examples given herein.

TABLE I

| Grinding of support material | | | | Polymerization | | | | | |
|---|---|---|---|---|---|---|---|---|---|
| MgCl$_2$ g | NaCl g | LiCl | Ti % by weight | Time in hours | Support material used in mg | polyethylene obtained in g | g polymer g Ti | g polymer g total support | g polymer g MgCl$_2$ | $\eta$ dl/g |
| 6.47 | 3.95 | — | 0.92 | 16 | 13.5 | 250 | 2,000,000 | 18,500 | 31,400 | 2.11 |
| 6.38 | — | 3.0 | 0.92 | 16 | 15.2 | 280 | 1,800,000 | 29,800 | 43,900 | 2.06 |
| 6.20 | 3.76 | — | 0.96 | 20 | 11.2 | 280 | 2,590,000 | 25,000 | 41,850 | 1.85 |
| 5.99 | 3.66 | — | 0.99 | 24 | 11.5 | 512 | 4,450,000 | 44,500 | 75,500 | 1.61 |
| 9.36 | — | — | 1.02 | 16 | 18.8 | 320 | 1,660,000 | 17,000 | 17,400 | 1.88 |
| 9.78 | — | — | 0.98 | 48 | 10.6 | 438 | 4,200,000 | 41,300 | 41,700 | 1.94 |

TABLE I-continued

| Grinding of support material | | | | | Polymerization | | | | | |
|---|---|---|---|---|---|---|---|---|---|---|
| MgCl₂ g | NaCl g | LiCl | Ti % by weight | Time in hours | Support material used in mg | polyethylene obtained in g | g polymer / g Ti | g polymer / g total support | g polymer / g MgCl₂ | η dl/g |
| 9.27 | — | — | 1.03 | 88 | 11.3 | 519 | 4,475,000 | 45,900 | 46,500 | 1.79 |

TABLE II

| Grinding of support material | | | | | Polymerization | | | | | |
|---|---|---|---|---|---|---|---|---|---|---|
| Cl₃TiOC₃H₇ g | MgCl₂ g | NaCl g | Ti % b.w. | Time in hrs. | Support material used in mg | Polyethylene obtained in g | g polymer / g Ti | g polymer / g total support | g polymer / g MgCl₂ | η dl/g |
| 0.48 | 6.29 | 3.84 | 1.02 | 44 | 13.3 | 155 | 1,150,000 | 11,650 | 19,700 | 1.33 |
| 0.51 | 5.97 | 3.64 | 1.13 | 64 | 16.4 | 187 | 1,010,000 | 11,400 | 18,700 | 1.36 |
| 0.53 | 10.21 | — | 1.11 | 64 | 6.1 | 96 | 1,550,000 | 15,700 | 15,900 | 1.46 |

TABLE III

| Grinding of support material | | | | | Polymerization | | | | | |
|---|---|---|---|---|---|---|---|---|---|---|
| Cl₃TiOCOCH₃ g | MgCl₂ g | NaCl g | Ti % b.w. | Time in hrs. | Support material used mg | polyethylene obtained g | g polymer / g Ti | g polymer / g total support | g polymer / g MgCl₂ | η dl/g |
| 0.36 | 6.23 | 3.83 | 0.78 | 44 | 23.5 | 100 | 543,000 | 4,250 | 7,150 | 1.61 |
| 0.42 | 9.63 | — | 0.95 | 88 | 14.9 | 86 | 610,000 | 5,770 | 5,820 | 1.52 |

TABLE IV

| Grinding of the support material | | | | | Polymerization | | | | | |
|---|---|---|---|---|---|---|---|---|---|---|
| MgCl₂ g | NaCl g | TiCl₃ARA g | Ti % | Time in hrs. | Supported material used mg | Polymer obtained g | g polymer / g Ti | g polymer / g total support | g polymer / g MgCl₂ | η dl/g |
| 7.3369 | 4.4589 | 2.5581 | 4.30 | 16 | 14 | 165 | 275,000 | 11,800 | 23,000 | 1.49 |
| 7.4394 | 4.4543 | 2.5539 | 4.26 | 24 | 20.4 | 470 | 540,000 | 23,000 | 44,800 | 1.36 |
| 11.8002 | — | 2.5501 | 4.28 | 16 | 15.6 | 166 | 249,000 | 10,650 | 12,950 | 1.33 |
| 11.753 | — | 2.513 | 4.25 | 88 | 19.8 | 465 | 552,000 | 23,500 | 28,500 | 1.13 |

TABLE V

| Grinding of support material | | | | | Polymerization | | | | | |
|---|---|---|---|---|---|---|---|---|---|---|
| TiCl₄ g | MgBr₂ g | NaBr g | Ti % b.w. | Time in hrs. | Support material used mg | Polyethylene obtained g | g polymer / g Ti | g polymer / g total support | g polymer / g MgBr₂ | η dl/g |
| 0.41 | 11.10 | — | 0.87 | 16 | 9.1 | 126 | 1,600,000 | 13,850 | 14,350 | 1.88 |
| 0.41 | 6.48 | 3.54 | 0.96 | 16 | 12.8 | 334 | 2,750,000 | 25,100 | 42,000 | 1.77 |

Polymerization conditions:
Autoclave hold. cap. = 2000 cc
Al(iso-C₄H₉)₃ = 2 cc
Temperature = 85° C.
H₂ = 5 atm
n.heptane = 1000 cc
Ethylene = 10 atm const.
Duration = 8 hours

TABLE VI

| Grinding of support material | | | | | | Polymerization | | | | | |
|---|---|---|---|---|---|---|---|---|---|---|---|
| TiCl₄ g | MgCl₂ g | diluent Type | diluent g | Ti % b.w. | Time in hrs. | Support material used mg | Polyethylene obtained g | g polymer / g Ti | g polymer / g total support | g polymer / g MgCl₂ | η dl/g |
| 0.41 | 9.6 | — | — | 1.00 | 24 | 18.0 | 185 | 1,025,000 | 10,250 | 10,730 | 1.33 |
| 0.41 | 5.49 | Na₂SO₄ | 4.16 | 0.99 | 24 | 24.5 | 260 | 1,065,000 | 11,050 | 19,250 | 1.25 |
| 0.41 | 6.70 | Na₂CO₃ | 3.70 | 0.92 | 24 | 17.6 | 160 | 980,000 | 9,100 | 16,150 | 1.33 |
| 0.41 | 4.76 | Na₂B₄O₇ | 4.93 | 0.99 | 24 | 17.5 | 100 | 578,000 | 5,720 | 12,000 | 1.40 |
| 0.41 | 4.84 | ZnO | 4.81 | 0.99 | 24 | 20.00 | 200 | 1,000,000 | 10,000 | 20,700 | 1.43 |

TABLE VI-continued

| Grinding of support material | | | | | | Polymerization | | | | | |
|---|---|---|---|---|---|---|---|---|---|---|---|
| | | | | | Support | | | g polymer | | | |
| TiCl$_4$ | MgCl$_2$ | diluent | | Ti % | Time in | material used | Polyethylene obtained | g polymer | g total | g polymer | $\eta$ |
| g | g | Type | g | b.w. | hrs. | mg | g | g Ti | support | g MgCl$_2$ | dl/g |
| 0.41 | 4.79 | Na$_2$CrO$_4$ | 4.82 | 1.00 | 24 | 13.1 | 120 | 915,000 | 9,150 | 19,150 | 1.45 |

Polymerization conditions:
Autoclave, hold. cap. = 2000 cc
H$_2$ = 7 atm.
Temperature = 85° C.
Ethylene = 6 atm const.
n.heptane = 1000 cc
duration = 4 hours
Al(iso-C$_4$H$_9$)$_3$ = 2 cc

TABLE VII

| Grinding of support material | | | | | | Polymerization | | | | | |
|---|---|---|---|---|---|---|---|---|---|---|---|
| | | | | | Support | | | g polymer | | | |
| TiCl$_4$ | MgCl$_2$ | diluent | | Ti % | Time in | material used | Polyethylene obtained | g polymer | g total | g polymer | $\eta$ |
| g | g | Type | g | b.w. | hrs. | mg | g | g Ti | support | g MgCl$_2$ | dl/g |
| 0.41 | 9.36 | — | — | 1.02 | 16 | 18.8 | 320 | 1,660,000 | 17,050 | 17,750 | 1.88 |
| 0.41 | 3.98 | ZnCl$_2$ | 5.68 | 0.99 | 16 | 15.2 | 220 | 1,470,000 | 14,450 | 36,700 | 2.00 |
| 0.41 | 5.94 | CdCl$_2$ | 2.89 | 1.08 | 16 | 20.3 | 246 | 1,725,000 | 12,250 | 19,200 | 1.91 |
| 0.41 | 5.88 | BeCl$_2$ | 4.80 | 0.91 | 16 | 20.0 | 330 | 1,825,000 | 16,500 | 31,050 | 1.91 |
| 0.41 | 2.72 | HgCl$_2$ | 7.03 | 0.98 | 16 | 24.5 | 290 | 1,205,000 | 11,850 | 44,200 | 1.91 |
| 0.41 | 5.02 | Cu$_2$Cl$_2$ | 4.91 | 0.96 | 16 | 16.2 | 236 | 1,510,000 | 14,550 | 30,100 | 2.27 |

Polymerization conditions:
Autoclave, hold. cap. = 2000 cc
H$_2$ = 5 atm
Temperature = 85° C.
Ethylene = 10 atm const.
n.heptane = 1000 cc
Duration = 8 hrs.
Al(iso-C$_4$H$_9$)$_3$ = 2 cc

TABLE VIII

| Test n | MgCl$_2$ g | Diluent type | g | Ti compound type | g | Ti content of supported catalyst % by weight | Amount of supported catalyst in polymerization g | Autoclave capacity cc |
|---|---|---|---|---|---|---|---|---|
| 1 | 2.6 | NaCl | 4.8 | TiCl$_3$ARA | 1.59 | 4.27 | 0.0176 | 3,000 |
| 2 | 11.8 | | | TiCl$_3$ARA | 2.55 | 4.28 | 0.0156 | 3,000 |
| 3 | 4.75 | ZnCl$_2$ | 5.05 | TiCl$_4$ | 0.41 | 1.015 | 0.0170 | 2,000 |
| 4 | 7.15 | ZnCl$_2$ | 3.22 | TiCl$_4$ | 0.41 | 0.96 | 0.0141 | 2,000 |
| 5 | 7.28 | HgCl$_2$ | 3.12 | TiCl$_4$ | 0.41 | 0.958 | 0.0273 | 2,000 |
| 6 | 3.42 | NaCl | 7.66 | TiCl$_4$ | 0.41 | 0.87 | 0.0192 | 2,000 |
| 7 | 7.62 | NaCl | 2.48 | TiCl$_4$ | 0.41 | 0.95 | 0.0138 | 2,000 |
| 8 | 4.72 | ZnCl$_2$ | 6.31 | CH$_3$COOTiCl$_3$ | 0.42 | 0.83 | 0.0133 | 2,000 |
| 9 | 9.68 | — | | CH$_3$COOTiCl$_3$ | 0.33 | 0.75 | 0.0289 | 2,000 |
| 0 | 9.36 | — | | TiCl$_4$ | 0.41 | 1.02 | 0.0188 | 2,000 |

| Test n | Amount of n-heptane cc | H$_2$ atm | C$_2$H$_4$ atm | Polymerization time hours | Polyethylene obtained g | g polymer g-Ti | g polymer g MgCl$_2$ |
|---|---|---|---|---|---|---|---|
| 1 | 1,500 | 7 | 6 | 4 | 200 | 265,000 | 39,300 |
| 2 | 1,500 | 7 | 6 | 4 | 165 | 249,000 | 12,950 |
| 3 | 1,000 | 5 | 10 | 8 | 265 | 1,535,000 | 33,500 |
| 4 | 1,000 | 5 | 10 | 8 | 204 | 1,510,000 | 21,700 |
| 5 | 1,000 | 5 | 10 | 8 | 331 | 1,265,000 | 18,000 |
| 6 | 1,000 | 5 | 10 | 8 | 170 | 1,015,000 | 29,700 |
| 7 | 1,000 | 5 | 10 | 8 | 236 | 1,800,000 | 32,500 |
| 8 | 1,000 | 5 | 10 | 8 | 180 | 1,535,000 | 33,000 |
| 9 | 1,000 | 5 | 10 | 8 | 101 | 468,000 | 3,600 |
| 0 | 1,000 | 5 | 10 | 8 | 320 | 1,660,000 | 17,400 |

TABLE IX

| Test | MgCl$_2$ g | Diluent type | g | TiCl$_4$ g | Ti content of supported catalyst component % by weight | Supported catalyst component employed in polymerization g | Polyethylene obtained g | g polymer / g Ti | g polymer / g MgCl$_2$ |
|---|---|---|---|---|---|---|---|---|---|
| 1 | 9.6 | — | | 0.41 | 1.00 | 0.018 | 185 | 1,025,000 | 10,730 |
| 2 | 5.0 | CaSO$_4$ | 4.90 | 0.41 | 0.97 | 0.0186 | 184 | 1,020,000 | 20,800 |
| 3 | 6.81 | CaCO$_3$ | 3.70 | 0.433 | 1.00 | 0.0133 | 126 | 947,000 | 15,200 |

We claim:

1. A component of catalysts for the polymerization of olefins and which is the product obtained by contacting (1) a titanium compound with a support consisting of a mixture of (2) an anhydrous Mg dihalide and (3) an anhydrous compound of a metal belonging to one of Groups I and II of said Periodic Table, the anhydrous Mg dihalide (2) being in an active state such that it has a surface area exceeding 3 m$^2$/g, or in its X-rays spectrum the diffraction line which is most intense in the X-rays powder spectrum of the normal, non-active Mg dihalide is less intense, the anhydrous compound of the Group I or Group II metal (3) being different from an anhydrous Mg dihalide, non-reactive with the anhydrous Mg dihalide under the conditions of preparing the catalyst, selected from the group consisting of lithium chloride, sodium chloride, sodium bromide, beryllium chloride, calcium chloride, strontium chloride, cadmium bromide, cuprous chloride, mercury(ic) chloride, sodium sulphate, sodium carbonate, zinc oxide, beryllium oxide, borax, calcium sulphate, calcium carbonate, beryllium sulphate, calcium stearate and sodium vinylsulphonate, and present in the mixture of (2) and (3) in an amount of from 30% to 70%.

2. Catalysts for the polymerization of olefins and obtained by mixing, as starting catalyst-forming components:
   (a) a hydride or organometallic compound of a metal belonging to one of Groups I to III of the Mendelyeev Periodic Table and
   (b) the product obtained by contacting (1) a titanium compound with a support consisting of a mixture of (2) an anhydrous Mg dihalide and (3) an anhydrous compound of a metal belonging to one of Groups I and II of said Periodic Table, the anhydrous Mg dihalide (2) being in an active state such that it has a surface area exceeding 3 m$^2$/g, or in its X-rays spectrum the diffraction line which is most intense in the X-rays powder spectrum of the normal, non-active Mg dihalide is less intense, the anhydrous compound of the Group I or Group II metal (3) being different from component (a) or the anhydrous compound of the Group II metal being different from an anhydrous Mg dihalide, non-reactive with the anhydrous Mg dihalide under the conditions of preparing the catalyst, selected from the group consisting of lithium chloride, sodium chloride, sodium bromide, beryllium chloride, calcium chloride, strontium chloride, cadmium bromide, cuprous chloride, mercury(ic) chloride, sodium sulphate, sodium carbonate, zinc oxide, beryllium oxide, borax, calcium sulphate, calcium carbonate, beryllium sulphate, calcium stearate and sodium vinylsulphonate, and present in the mixture of (2) and (3) in an amount of from 30% to 70%.

3. Catalysts according to claim 2, component (b) of which is obtained by co-grinding the Ti compound (1) with the mixture of (2) and (3), for grinding times and under grinding conditions such that the anhydrous Mg dihalide (2) is converted to the active form.

4. Catalysts according to claim 3, in which the anhydrous Mg dihalide (2) is MgCl$_2$ or MgBr$_2$.

5. Catalysts according to claim 2, component (b) of which is obtained by contacting the Ti compound (1) with a mixture of the anhydrous Mg dihalide (2) in preactivated form and the anhydrous compound of the Group I or Group II metal (3).

6. Catalysts according to claim 5, component (b) of which is obtained by contacting the Ti compound (1) with a mixture of anhydrous Mg dihalide (2) preactivated by grinding and the anhydrous compound of the Group I or Group II metal (3).

7. Catalysts according to claim 5, in which the anhydrous Mg dihalide is MgCl$_2$ or MgBr$_2$.

8. Catalysts according to claim 2, component (b) of which is obtained by contacting the Ti compound (1) with a mixture of anhydrous Mg dihalide (2) obtained in the active form by disproportionation of a Grignard reagent having the general formula RMgX in which R is a hydrocarbon radical and X is halogen, and the anhydrous compound of the Group I or Group II metal (3).

9. Catalysts according to claim 8, in which the active anhydrous Mg dihalide is MgCl$_2$ or MgBr$_2$.

10. Catalysts according to claim 2, component (b) of which is obtained by contacting the Ti compound (1) with a mixture of anhydrous Mg dihalide (2) obtained in the active form by treating a Grignard reagent having the formula RMgX in which R is a hydrocarbon radical and X is halogen with gaseous hydrogen chloride, and the anhydrous compound of the Group I or Group II metal (3).

11. A catalyst according to claim 10, in which the active anhydrous Mg dihalide is MgCl$_2$ or MgBr$_2$.

12. Catalysts according to claim 2, component (b) of which is obtained by contacting the Ti compound (1) with a mixture of anhydrous Mg dihalide obtained in the active form by thermal decomposition, under reduced pressure, of an addition compound of the corresponding normal, non-active Mg dihalide and a Lewis base or acid, and the anhydrous compound of the Group I or Group II metal (3).

13. Catalysts according to claim 12, in which the active anhydrous Mg dihalide is MgCl$_2$ or MgBr$_2$.

14. Catalysts according to claim 2, in which the amount of the Ti compound (1) used in preparing component (b) is from 0.01% to 30% by weight, on the weight of the mixture of (2) and (3).

15. Catalysts according to claim 2, in which the amount of the Ti compound (1) used in preparing component (b) is from 1% to 10% by weight, on the weight of the mixture of (2) and (3).

16. Catalysts according to claim 2, component (a) of which is a hydride or alkyl compound of aluminum.

17. Catalysts according to claim 2, component (a) of which is an aluminum trialkyl.

18. A process for polymerizing ethylene and mixtures thereof with alpha-olefins and/or diolefins, characterized in that the monomeric material is polymerized in contact with a catalyst according to claim 2.

19. The process according to claim 18, further characterized in that the polymerization of the monomeric material is carried out at a temperature of −80° C. to +200° C., in the presence of a conventional regulator of the molecular weight of the polymer produced, and the polymer obtained is useful as such without requiring purifying treatments for the removal of catalyst residues therefrom.

20. The process according to claim 19, further characterized in that the monomeric material is polymerized in an inert liquid diluent.

21. The process according to claim 19, further characterized in that the monomeric material is polymerized in the substantial absence of an inert liquid diluent.

22. The process of claim 18, in which the monomeric material polymerized is ethylene.

* * * * *